US008823585B2

(12) United States Patent
Karaoguz et al.

(10) Patent No.: US 8,823,585 B2
(45) Date of Patent: Sep. 2, 2014

(54) SENSOR-ASSISTED LOCATION-AWARE MOBILE DEVICE

(75) Inventors: Jeyhan Karaoguz, Irvine, CA (US); Charles Abraham, Los Gatos, CA (US); Mark Buer, Gilbert, AZ (US); David Garrett, Irvine, CA (US); David Albert Lundgren, Mill Valley, CA (US); David Murray, Mission Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 432 days.

(21) Appl. No.: 12/748,240

(22) Filed: Mar. 26, 2010

(65) Prior Publication Data

US 2011/0199259 A1 Aug. 18, 2011

Related U.S. Application Data

(60) Provisional application No. 61/304,253, filed on Feb. 12, 2010.

(51) Int. Cl.
*G01S 19/48* (2010.01)

(52) U.S. Cl.
CPC ..................... *G01S 19/48* (2013.01)
USPC ...................................... 342/357.31

(58) Field of Classification Search
CPC ....................................................... G01S 19/48
USPC ........................................ 342/357.32, 357.31
See application file for complete search history.

(56) References Cited

U.S. PATENT DOCUMENTS

| 5,644,317 | A | * | 7/1997 | Weston et al. | 342/357.31 |
| 5,936,572 | A | * | 8/1999 | Loomis et al. | 342/357.29 |
| 6,801,159 | B2 | * | 10/2004 | Swope et al. | 342/357.31 |
| 6,999,779 | B1 | * | 2/2006 | Hashimoto | 455/456.2 |

(Continued)

FOREIGN PATENT DOCUMENTS

| EP | 2034271 A1 | 3/2009 |
| TW | 370081 U1 | 12/2009 |
| TW | 201003105 A | 1/2010 |
| TW | 201004454 A | 1/2010 |

OTHER PUBLICATIONS

European Patent Office, Communication with Extended European Search Report in Application No. 11001084.0, dated May 30, 2011 (5 total pages).

(Continued)

*Primary Examiner* — Gregory C Issing
(74) *Attorney, Agent, or Firm* — Sterne, Kessler, Goldstein & Fox PLLC

(57) ABSTRACT

A GNSS enabled mobile device moves from a first area where GNSS signal quality and/or level is above a threshold to a second area where GNSS signal quality and/or level is below the threshold. The GNSS enabled mobile device in the second area determines its own location utilizing previous GNSS measurements in the first area. GNSS signals are received to calculate GNSS measurements whenever the GNSS enabled mobile device is in the first area. The calculated GNSS measurements are utilized to determine a location of the GNSS enabled mobile device within the first area. The GNSS enabled mobile device in the second area utilizes the most current GNSS measurements in the first area to determine its own location. Sensors such as an image sensor, a light sensor, an audio sensor and/or a location sensor are used to refine the location of the GNSS enabled mobile device in the second area.

19 Claims, 4 Drawing Sheets

(56) References Cited

U.S. PATENT DOCUMENTS

| | | | |
|---|---|---|---|
| 7,474,897 B2 * | 1/2009 | Morgan et al. | 455/456.5 |
| 2002/0019698 A1 * | 2/2002 | Vilppula et al. | 701/207 |
| 2003/0182053 A1 | 9/2003 | Swope | |
| 2003/0225893 A1 | 12/2003 | Roese et al. | |
| 2007/0239813 A1 | 10/2007 | Pinder | |
| 2009/0219209 A1 * | 9/2009 | Bush et al. | 342/450 |
| 2010/0017116 A1 | 1/2010 | Lee | |

OTHER PUBLICATIONS

Chinese language office action in counterpart Taiwanese Application No. 100104793, mailed Dec. 2, 2013 from the Taiwanese Patent Office; 6 pages.

* cited by examiner

US 8,823,585 B2

SENSOR-ASSISTED LOCATION-AWARE MOBILE DEVICE

CROSS-REFERENCE TO RELATED APPLICATIONS/INCORPORATION BY REFERENCE

This patent application makes reference to, claims priority to and claims the benefit from U.S. Provisional Patent Application Ser. No. 61/304,253 filed on Feb. 12, 2010.

This patent application makes reference to:
U.S. Application Ser. No. 61/303,931 filed on Feb. 12, 2010,
U.S. Application Ser. No. 61/303,975 filed on Feb. 12, 2010,
U.S. Application Ser. No. 61/314,521 filed on Mar. 16, 2010,
U.S. Application Ser. No. 61/306,639 filed on Feb. 22, 2010,
U.S. Application Ser. No. 61/309,071 filed on Mar. 1, 2010,
U.S. application Ser. No. 12/732,997 filed on Mar. 26, 2010,
U.S. application Ser. No. 12/748,039 filed on Mar. 26, 2010,
U.S. application Ser. No. 12/748,016 filed on Mar. 26, 2010,
U.S. application Ser. No. 12/748,010 filed on Mar. 26, 2010, and
U.S. application Ser. No. 12/728,957 filed on Mar. 26, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for sensor-assisted location-aware mobile device.

BACKGROUND OF THE INVENTION

Location-based services are emerging as a new type of value-added service provided by mobile communication network. Location-based services are mobile services in which the user location information is used in order to enable various location-based applications such as, for example, enhanced 911 (E-911), location-based 411, location-based messaging and/or location-based friend finding services.

A location of a mobile device may be determined in different ways such as, for example, using network-based technology, using terminal-based technology, and/or hybrid technology (a combination of the former technologies). Many positioning technologies such as, for example, Time of Arrival (TOA), Observed Time Difference of Arrival (OT-DOA), Enhanced Observed Time Difference (E-OTD) as well as the Global navigation satellite-based systems (GNSS) such as GPS, GLONASS, Galileo, and/or Assisted-GNSS (A-GNSS), are in place to estimate the location (latitude and longitude) of the mobile device and convert it into a meaningful X, Y coordinate for LBS applications. A-GNSS technology combines satellite positioning and communication networks such as mobile networks to reach performance levels allowing the wide deployment of Location-Based Services.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for sensor-assisted location-aware mobile device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for sensor-assisted location-aware mobile device. In various embodiments of the invention, the location of a GNSS enabled device may be needed to support location-based applications. In instances where the GNSS enabled mobile device is moving into an area where GNSS signal quality and/or level is below or equal to a threshold, the location of the GNSS enabled device may be determined based on a location-aware sensor environment in the area and previous GNSS measurements such as the most current GNSS measurements in an area where GNSS signal quality and/or level is above the threshold. The location-aware sensor environment refers to a plurality of sensors each with known location information. The area where GNSS signal quality and/or level is above the threshold may be referred to as a first area. The area where GNSS signal quality and/or level is below or equal to the threshold may be referred to as a second area. GNSS signals from visible GNSS satellites may be received and utilized whenever the GNSS enabled mobile device is in the first area. For example, the received GNSS signals may be utilized by the GNSS enabled mobile device to calculate GNSS measurements. The GNSS enabled mobile device may utilize the calculated GNSS measurements to determine a location of the GNSS enabled mobile device within the first area. The most current GNSS measurements are updated using the calculated GNSS measurements. In instances where the GNSS enabled mobile device is moving into the second area, the updated most current GNSS measurements in the first area may be applied to determine the location of the GNSS enabled mobile device in the second area. In instances where sensors such as, for example, an image sensor, a light sensor, an audio sensor and/or a location sensor, are available in the second area, the GNSS enabled mobile device may be operable to collect sensor data for encountered sensor targets with known locations within the location-aware sensor environment in the second area. The GNSS enabled mobile device may convert the collected sensor data to corresponding locations of the encountered sensor targets to refine or propagate the location of the GNSS enabled mobile device in the second area.

Figure 1:
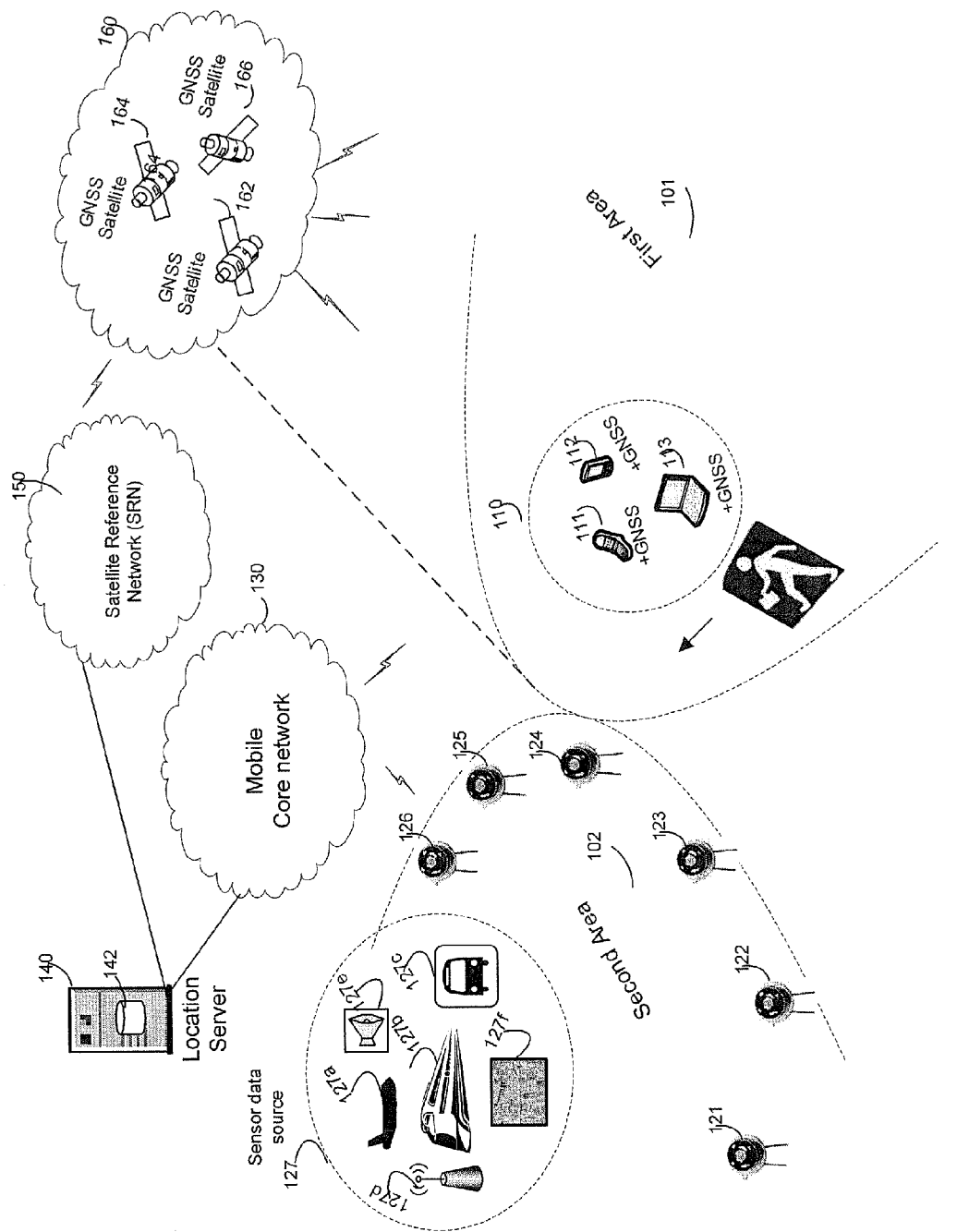
FIG. 1 is a diagram illustrating an exemplary communication system that is operable to locate a GNSS enabled mobile device in an area where GNSS signal quality and/or level is below a threshold, in accordance with an embodiment of the invention.

FIG. 1 is a diagram illustrating an exemplary communication system that is operable to locate a GNSS enabled mobile device in an area where GNSS signal quality and/or level is below a threshold, in accordance with an embodiment of the invention. Referring to FIG. 1, there is shown a communication system 100. The communication system 100 comprises a first area 101, a second area 102, a plurality of GNSS enabled mobile devices 110, of which GNSS enabled mobile devices 111-113 are illustrated, a plurality of sensors 121-126 that are distributed within the second area 102, a sensor data source 127 comprising sensor targets 127a-127e, a mobile core network 130, a location server 140 communicatively coupled with a reference database 142, a satellite reference network (SRN) 150 and a satellite infrastructure 160.

The first area 101 may comprise spaces such as an open outdoor area where GNSS receivers receive GNSS signals from visible GNSS satellites such as the GNSS satellites 162-166. Within the first area 101, the quality and/or level of the received GNSS signals may be greater than a particular threshold or value so as to be utilized to support corresponding applications.

The second area 102 may comprise spaces where GNSS receivers may not received GNSS signals and/or may receive GNSS signals, but the quality and/or level of the received GNSS signals may be less than or equal to a particular threshold or value required to support corresponding applications. The second area 102 may comprises areas such as deep urban areas and/or indoor areas.

A GNSS enabled mobile device such as the GNSS enabled mobile device 111 may comprise suitable logic, circuitry, interfaces and/or code that are operable to concurrently receive GNSS satellite broadcast signals from GNSS satellites in view such as, for example, the GNSS satellites 162-166, and radio signals from radio networks. In instances where the GNSS enabled mobile device 111 is moving within the first area 101, the GNSS enabled mobile device 111 may be operable to take various GNSS measurements such as pseudorange and/or carrier phase on the received GNSS signals. The GNSS measurements may be utilized by the GNSS enabled mobile device 111 to calculate its own navigation information such as, for example, GNSS position and/or velocity. The most current GNSS measurements may be tracked and updated whenever the GNSS enabled mobile device 111 is within the first area 101.

In an exemplary embodiment of the invention, in instances where the GNSS enabled mobile device 111 enters into the second area 102 from the first area 101, pervious GNSS measurements such as the most current GNSS measurements in the first area 101 may be utilized by the GNSS enabled mobile device 111 to determine its own location within the second area 102.

In another exemplary embodiment of the invention, in instances where the GNSS enabled mobile device 111 in the second area 102 may encounter one or more sensor targets such as, for example, the sensor targets 127a-127e, with known sensor target locations. The GNSS enabled mobile device 111 may be operable to receive sensor data from the encountered sensor targets with known sensor target locations. In this regard, the GNSS enabled mobile device 111 may be configured to convert the received sensor data to corresponding sensor target locations. The sensor target locations may comprise, for example, a location of a street intersection, a location of a business or residential building, a location indicated in an announcement such as a train station announcement. The sensor target locations may be utilized by the GNSS enabled mobile device 111 to refine and/or propagate its own location, which may be determined utilizing pervious GNSS measurements such as the most current GNSS measurements in the first area 101.

A sensor such as the sensor 121 may comprise suitable logic, circuitry, interfaces and/or code that are operable to collect data from various sensor targets such as the sensor targets 127a-127e in the sensor data source 127. The collected sensor data may be communicated to host devices such as the GNSS enabled mobile device 111 for further analysis. The sensor 121 may comprise, for example, an image sensor, a light sensor, an audio sensor and/or a location sensor. Sensor targets such as the sensor targets 127a-127e may comprise outdoor and/or indoor physical objects, spaces and/or any other things that may be sensed by the sensors 121-126. For example, a sensor target may be an indoor access point, a map, a train station, a bus stop, an airport, light, voice, and/or devices that transmit location information.

The mobile core network 130 may comprise suitable logic, circuitry, interfaces and/or code that are operable to interface various access networks such as, for example, a CDMA network, a UMTS network and/or a WiMAX network, with external data networks such as packet data networks (PDNs). The mobile core network 130 may be configured to communicate various data services such as location-based services to associated user terminals such as, for example, the GNSS enabled mobile devices 111-113. The mobile core network 130 may be operable to communicate with the location server 140 for the location of the GNSS enabled mobile devices 111-113 to support corresponding location-based services.

The location server 140 may comprise suitable logic, circuitry, interfaces and/or code that are operable to access the satellite reference network (SRN) 150 to collect GNSS satellite data by tracking GNSS constellations through the SRN 150. The location server 140 may be operable to utilize the collected GNSS satellite data to generate GNSS assistance data comprising, for example, ephemeris data, LTO data, reference positions and/or time information. The location server 140 may be operable to collect and/or retrieve location information of associated users such as the GNSS enabled mobile devices 111-113. In this regard, the location of the GNSS enabled mobile devices 111-113 within the second area 102 may be determined based on previous GNSS measurements such as the most current GNSS measurements in the first area 101. In addition, the determined location of the GNSS enabled mobile device 111 may be refined or propagated based on sensor target locations of one or more sensor targets encountered within the second area 102.

The SRN 150 may comprise suitable logic, circuitry, interfaces and/or code that are operable to collect and/or distribute data for GNSS satellites on a continuous basis. The SRN 150 may comprise a plurality of GNSS reference tracking stations located around the world to provide assistant GNSS (A-GNSS) coverage all the time in both a home network and/or any visited network.

The GNSS satellites 162 through 166 may comprise suitable logic, circuitry, interfaces and/or code that may be operable to generate and broadcast satellite navigational information. The broadcast satellite navigational information may be collected by the SRN 150 to be utilized by the location server 140 to support LBS services. The GNSS satellites 162 through 166 may comprise GPS, Galileo, and/or GLONASS satellites.

In an exemplary operation, a GNSS enabled mobile device such as the GNSS enabled mobile device 111 may be operable to receive services such as location-based information provided by the mobile core network 130. The location of the GNSS enabled mobile device 111 may be tracked by the location server 140 to ensure the delivery of the location-based information to the GNSS enabled mobile device 111. In instances where the GNSS enabled mobile device 111 is moving within the first area 101, the location of the GNSS enabled mobile device 111 may be operable to receive GNSS signals from visible GNSS satellites such as the GNSS satellites 162-166. Various GNSS measurements such as pseudorange and/or carrier phase may be carried out on the received GNSS signals by the GNSS enabled mobile device 111.

The GNSS measurements may be utilized to calculate the location of the GNSS enabled mobile device 111. The most current GNSS measurements in the first area 101 may be updated whenever the GNSS enabled mobile device 111 is in the first area 101. In instances where the GNSS enabled mobile device 111 is moving from the first area 101 into the second area 102, GNSS signals from the GNSS satellites 162-166 may not be received, or may be received, but the quality and/or level of the received GNSS signal is below a particular value. In this regard, the GNSS enabled mobile device 111 may be operable to determine its own location utilizing previous GNSS measurements such as the most current GNSS measurements in the first area 101. In instances where sensors such as the sensors 121-126 may be available in the second area 102, the GNSS enabled mobile device 111 may be operable to receive sensor data from the sensors 121-126 for one or more sensor targets such as the sensor targets 127a-127e with known sensor target locations. The GNSS enabled mobile device 111 may be operable to convert the received sensor data to corresponding sensor target locations. The GNSS enabled mobile device 111, in the second area 102, may be operable to utilize the sensor target locations to refine or propagate its own location, which may be derived from previous GNSS measurements such as the most current GNSS measurements in the first area 101.

Figure 2:
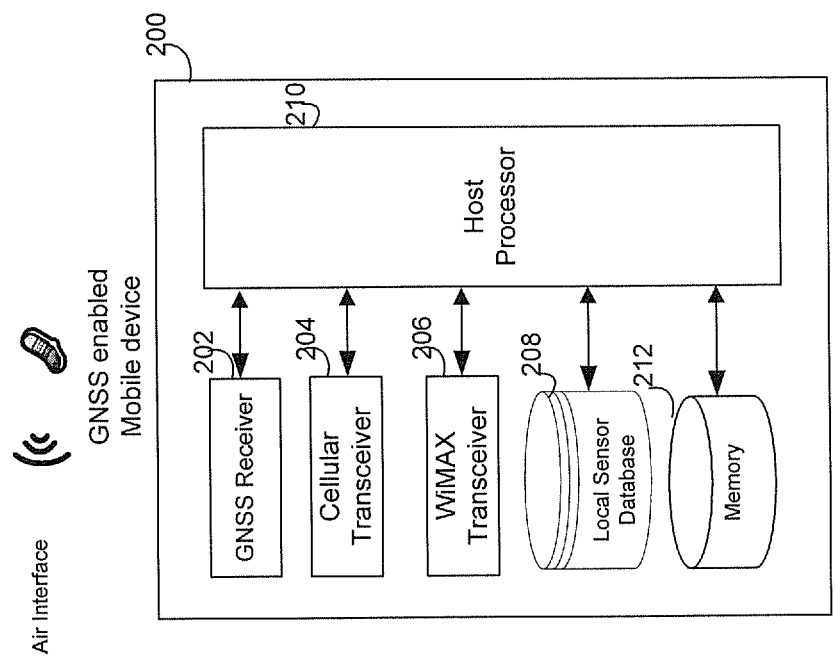
FIG. 2 is a block diagram illustrating an exemplary GNSS enabled mobile device that is operable to determine its own location in an area where GNSS signal quality and/or level is below a threshold, in accordance with an embodiment of the invention.

FIG. 2 is a block diagram illustrating an exemplary GNSS enabled mobile device that is operable to determine its own location in an area where GNSS signal quality and/or level is below a threshold, in accordance with an embodiment of the invention. Referring to FIG. 2, there is shown a GNSS enabled mobile device 200. The GNSS enabled mobile device 200 comprises a GNSS receiver 202, a cellular transceiver 204, a WiMAX transceiver 206, a local sensor database 208, a host processor 210 and a memory 212.

The GNSS receiver 202 may comprise suitable logic, circuitry, interfaces and/or code that may be operable to detect and receive GNSS signals from a plurality of visible GNSS satellites such as the GNSS satellite 162-166. In instances where the GNSS enabled mobile device 200 is in the first area 101, where GNSS signal quality and/or level is above a threshold, the received GNSS signals may be utilized for various GNSS measurements such as pseudorange and/or carrier phase of corresponding broadcasting GNSS satellites. The GNSS receiver 202 may be operable to provide the received GNSS signals to the host processor 210 to calculate navigation information such as a GNSS position and/or a velocity of the GNSS receiver 202. In instances where the GNSS enabled mobile device 200 is moving into the second area 102 from the first area 101, GNSS signal quality and/or level at the GNSS receiver 202 may be below the threshold. In this regard, the GNSS receiver 202 may be deactivated by the host processor 210 to save power whenever in the second area 102.

The cellular transceiver 204 may comprise suitable logic, circuitry, interfaces and/or code that may be operable to receive and/or transmit radio frequency signals using various cellular communication technologies such as, for example, CDMA, GSM, UMTS and/or LTE. The cellular transceiver 204 may be operable to communicate information such as, for example, the location of the GNSS enabled mobile device 200 with the location server 140 via the mobile core network 130. The location of the GNSS enabled mobile device 200 may comprise locations in the first area 101 where GNSS signal quality and/or level is above a threshold and/or in the second area 102 where GNSS signal quality and/or level is below or equal to the threshold.

The WiMAX transceiver 206 may comprise suitable logic, circuitry, interfaces and/or code that may be operable to receive and/or transmit radio frequency signals using WiMAX technology. The WiMAX transceiver 206 may be operable to communicate information such as, for example, location information of the GNSS enabled mobile device 200 with the location server 140 via the mobile core network 130. The location of the GNSS enabled mobile device 200 may comprise locations in the first area 101 and/or the second area 102.

The local sensor database 208 may comprise suitable logic, circuitry, interfaces and/or code that may be operable to manage and store data comprising sensor data collected via a plurality of sensors such as the sensors 121-126. In this regard, the sensor data may be collected from sensor targets with known sensor target locations. In instances where the GNSS enabled mobile device 200 is in the second area 102, the sensor target locations for the collected sensor data in the local sensor database 208 may be utilized by the host processor 210 to determine and/or refine the location of the GNSS enabled mobile device 200.

The host processor 210 may comprise suitable logic, circuitry, interfaces and/or code that may be operable to manage and/or control operations of associated device component units such as, for example, the GNSS receiver 202, the cellular transceiver 204, and/or the local sensor database 208, depending on usages. For example, the host processor 210 may be operable to activate or deactivate one or more associated radios such as the GNSS receiver 202 as a needed basis to save power. The host processor 210 may be operable to coordinate operations among associated device component units for particular applications.

In instances where the GNSS enabled mobile device 200 is moving in the first area 101, the host processor 210 may be operable to carry out various GNSS measurements such as pseudorange and/or carrier phase on GNSS signals received via the GNSS receiver 202. The host processor 210 may be operable to utilize the GNSS measurements to calculate navigation information such as a GNSS position and/or a velocity of the GNSS receiver 202. The calculated GNSS position of the GNSS receiver 202 may be utilized to support various applications such as, for example, location-based application provided by the mobile core network 130.

In instances where the GNSS enabled mobile device 200 enters into the second area 102 from the first area 101, the host processor 210 may be operable to utilize previous GNSS measurements such as the most current GNSS measurements in the first area 101 to calculate the location of the GNSS enabled mobile device 200 when needed. In instances where sensor data are received from one or more sensor targets with known locations, the host processor 210 may be operable to convert received sensor data to corresponding known sensor target locations. For example, the host processor 210 may be operable to identify sensor target location information of encountered sensor targets from received sensor data such as a map indicating a street intersection, a view with a business or residential building, and/or a train station announcement. The identified sensor target location information of the encountered sensor targets may be utilized by the host processor 210 to locate the GNSS enabled mobile device 200 within the second area 102. Specifically, the host processor 210 may be operable to combine the identified sensor target location information of the encountered sensor targets with previous GNSS measurements such as the most current GNSS measurements in the first area 101 to determine and/or refine the location of the GNSS enabled mobile device 200 within the second area 102.

The memory 212 may comprise suitable logic, circuitry, interfaces and/or code that may be operable to store information such as executable instructions and data that may be utilized by the host processor 210 and/or other associated component units such as, for example, the GNSS receiver 202 and/or the local sensor database 208. The memory 212 may comprise RAM, ROM, low latency nonvolatile memory such as flash memory and/or other suitable electronic data storage.

In an exemplary operation, the GNSS enabled mobile device 200 may be operable to determine its own location for location-based applications provided by the mobile core network 130. In instances where the GNSS enabled mobile device 200 is in the first area 101, the host processor 210 may be operable to perform GNSS measurements on GNSS signals received over the GNSS receiver 202. The resulting GNSS measurements may be utilized to calculate navigation information such as a GNSS position and/or a velocity of the GNSS receiver 202. The host processor 210 may be operable to apply the calculated GNSS position of the GNSS receiver 202 to support corresponding location-based applications.

In instances where the GNSS enabled mobile device 200 is moving into the second area 102 from the first area 101, previous GNSS measurements such as the most current GNSS measurements in the first area 101 may be utilized by the host processor 210 to calculate the location of the GNSS enabled mobile device 200 within the second area 102 when needed. In instances where sensor data are received from encountered one or more sensor targets with known locations, the host processor 210 may be operable to convert received sensor data to corresponding known location information. The corresponding sensor target location information of the sensor targets may be utilized by the host processor 210 to locate the GNSS enabled mobile device 200 within the second area 102. More specifically, the host processor 210 may be operable to combine the sensor target location information with previous GNSS measurements such as the most current GNSS measurements in the first area 101 to determine and refine the location of the GNSS enabled mobile device 200 within the second area 102.

Figure 3:
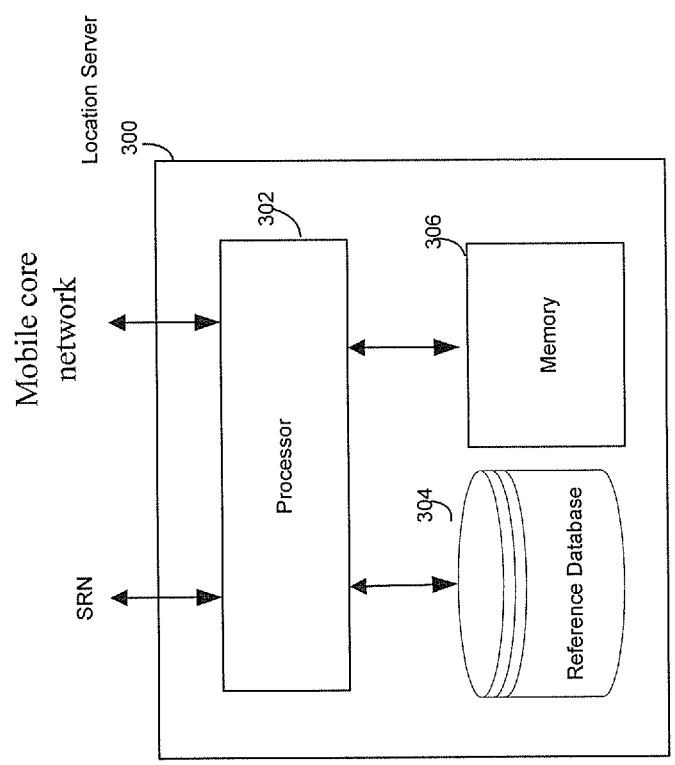
FIG. 3 is a block diagram illustrating an exemplary location server that is operable to collect location information of a GNSS enabled mobile device in an area where GNSS signal quality and/or level is below a threshold, in accordance with an embodiment of the invention.

FIG. 3 is a block diagram illustrating an exemplary location server that is operable to collect location information of a GNSS enabled mobile device in an area where GNSS signal quality and/or level is below a threshold, in accordance with an embodiment of the invention. Referring to FIG. 3, there is shown a location server 300. The location server 300 may comprise a processor 302, a reference database 304 and a memory 306.

The processor 302 may comprise suitable logic, circuitry, interfaces and/or code that may be operable to manage and/or control operations of the reference database 304 and the memory 306. The processor 302 may be operable to communicate with the satellite reference network (SRN) 150 so as to collect GNSS satellite data by tracking GNSS constellations through the SRN 150. The processor 302 may be operable to utilize the collected GNSS satellite data to build the reference database 304, which may be coupled internally or externally to the location server 300. The processor 302 may also be operable to receive or collect location information of users such as the GNSS enabled mobile devices 111-113. The collected location information of the GNSS enabled mobile devices may correspond to locations in the first area 101 where GNSS signal quality and/or level is above a threshold and/or in the second area 102 where GNSS signal quality and/or level is below or equal to the threshold. In this regard, the location of, for example, the GNSS enabled mobile device 111 in the second area 102, may be determined based on previous GNSS measurements such as the most current GNSS measurements in the first area 101. The determined location of the GNSS enabled mobile device may be refined or propagated with assistance of sensor targets with known locations.

The reference database 304 may comprise suitable logic, circuitry, interfaces and/or code that may be operable to store location information of associated users, for example, location information of the GNSS enabled mobile devices 111-113. The reference database 304 may be updated or propagated as a needed basis, aperiodically, or periodically.

The memory 306 may comprise suitable logic, circuitry, interfaces and/or code that may be operable to store information such as executable instructions and data that may be utilized by the processor 302 and/or other associated component units such as, for example, the reference database 304. The memory 306 may comprise RAM, ROM, low latency nonvolatile memory such as flash memory and/or other suitable electronic data storage.

In an exemplary operation, the processor 302 may be operable to collect GNSS satellite data through the SRN 150 to build the reference database 304. Location information of users such as the GNSS enabled mobile devices 111-113 may also be tracked or collected in both the first area 101 and the second area 102 to support location-based applications. In this regard, previous GNSS measurements such as the most current GNSS measurements in the first area 101 may be utilized to locate the GNSS enabled mobile devices 111-113 in the second area 102. The corresponding locations of the GNSS enabled mobile devices 111-113 may be refined or propagated utilizing known locations of sensor targets.

Figure 4:
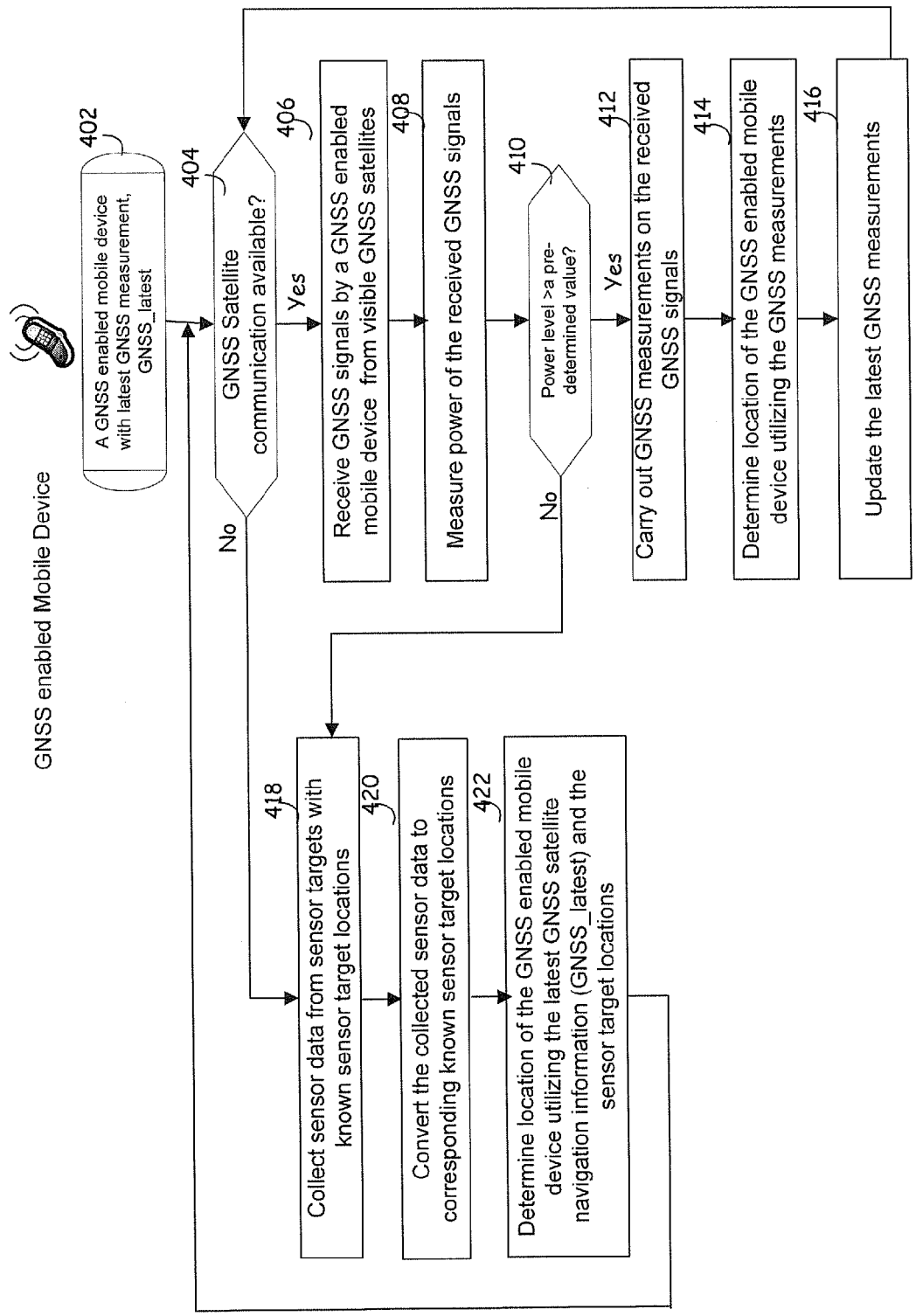
FIG. 4 is a flow chart illustrating an exemplary procedure that is utilized to perform sensor-assisted location for a GNSS enabled mobile device in an area where GNSS signal quality and/or level is below a threshold utilizing previous GNSS measurements in an area where GNSS signal quality and/or level is above the threshold, in accordance with an embodiment of the invention.

FIG. 4 is a flow chart illustrating an exemplary procedure that is utilized to perform sensor-assisted location for a GNSS enabled mobile device in an area where GNSS signal quality and/or level is below a threshold utilizing previous GNSS measurements in an area where GNSS signal quality and/or level is above the threshold, in accordance with an embodiment of the invention. Referring to FIG. 4, the exemplary steps may start with step 402. In step 402, a GNSS enabled mobile device such as the GNSS enabled mobile device 200 may be operable to receive services such as a location-based application from the mobile core network 130. The parameter GNSS_latest represents the most current GNSS measurement on received GNSS signals at the GNSS enabled mobile device 200 in the first area 101, where GNSS signal quality and/or level is above a threshold or a pre-determined value. In step 404, it may be determined whether GNSS satellite communication is available to the GNSS enabled mobile device 200. In instances where GNSS satellites are visible to the GNSS enabled mobile device 200 such as in the first area 101, then in step 406, the GNSS enabled mobile device 200 may be operable to receive GNSS signals from the GNSS satellites 162-166.

In step 408, the GNSS enabled mobile device 200 may be operable to measure power levels of the received GNSS signals. In step 410, it may be determined whether the measured power level is greater than a pre-determined value or a threshold to ensure the QoS of the received services at the GNSS enabled mobile device 200. In instances where the measured power level is greater than the pre-determined value or the threshold at the GNSS enabled mobile device 200, then in step 412, the GNSS enabled mobile device 200 may be operable to carry out GNSS measurements such as, for example, pseudorange and/or carrier phases of broadcasting GNSS satellites, on the received GNSS signals. In step 414, the location of the GNSS enabled mobile device 200 may be determined utilizing the GNSS measurements. In step 416, the parameter GNSS_latest may be updated using the GNSS measurements. The exemplary steps may return to step 404.

In step 404, in instances where GNSS satellite communication is not available to the GNSS enabled mobile device 200 such as in the second area 102, then in step 418, the GNSS enabled mobile device 200 may be operable to collect sensor data from sensor targets such as the sensor targets 127a-127e with known locations. In step 420, the GNSS enabled mobile device 200 may be operable to convert the received sensor data to corresponding known sensor target locations. In step 422, the GNSS enabled mobile device 200 may be operable to determine its own location utilizing previous GNSS measurements such as the most current GNSS measurements in the first area 101 and the known sensor target locations. The exemplary steps may return to step 404.

In step 410, in instances where the measured power level is less than or equal to the pre-determined value or the threshold at the GNSS enabled mobile device 200, then the exemplary steps may continue in step 418.

In various exemplary aspects of the method and system for sensor-assisted location-aware mobile device, a GNSS enabled device such as the GNSS enabled mobile device 200 may be operable to receive services such as location-based applications from the mobile core network 130. The location of the GNSS enabled mobile device 200 may be required or needed to support the location-based applications. In instances where the GNSS enabled mobile device 200 is moving from the first area 101 where GNSS signal quality and/or level is above a threshold into the second area 102 where GNSS signal quality and/or level is below or equal to the threshold, the location of the GNSS enabled device 200 in the second area 102 may be determined based on a location-aware sensor environment in the second area 102 and previous GNSS measurements such as the most current GNSS measurements in the first area 101. GNSS signals from visible GNSS satellites such as the GNSS satellites 162-166 may be received and utilized whenever the GNSS enabled mobile device 200 is in the first area 101. The received GNSS signals via the GNSS receiver 202 may be utilized by the host processor 210 to carry out or calculate GNSS measurements on the received GNSS signals. The calculated GNSS measurements may be utilized to determine a location of the GNSS enabled mobile device 200 within the first area 101. As described with respect to FIGS. 1, 2 and 4, the GNSS enabled mobile device 200 may be configured to update the most current GNSS measurements utilizing the calculated GNSS measurements. In instances where the GNSS enabled mobile device 200 enters into the second area 102 from the first area 101, the updated most current GNSS measurements in the first area 101 may be utilized to determine the location of the GNSS enabled mobile device 200 in the second area 102. In instances where one or more sensors such as the sensors 121-126 may be available in the second area 102, the GNSS enabled mobile device 200 may be operable to collect sensor data from the sensors 121-126 for encountered sensor targets with known locations within the location-aware sensor environment in the second area 102. The sensors 121-126 may comprise an image sensor, a light sensor, an audio sensor and/or a location sensor. The GNSS enabled mobile device 200 may be operable to convert the collected sensor data to corresponding locations of the encountered sensor targets. The locations of the encountered sensor targets may be utilized to refine or propagate the location of the GNSS enabled mobile device 200 in the second area.

In instances where the GNSS enabled mobile device 200 is moving within the first area 101, the host processor 210 may be operable to carry out various GNSS measurements such as pseudorange and/or carrier phase on GNSS signals received via the GNSS receiver 202. The host processor 210 may be operable to utilize the GNSS measurements to calculate navigation information such as a GNSS position and/or a velocity of the GNSS receiver 202. The calculated GNSS position of the GNSS receiver 202 may be utilized to support various applications such as, for example, location-based application provided by the mobile core network 130.

In instances where the GNSS enabled mobile device 200 enters into the second area 102 from the first area 101, the host processor 210 may be operable to utilize previous GNSS measurements such as the most current GNSS measurements in the first area 101 to calculate the location of the GNSS enabled mobile device 200 within the second area 102 when needed. In instances where sensor data are received from one or more sensor targets with known locations, the host processor 210 may be operable to convert received sensor data to corresponding known sensor target locations. For example, the host processor 210 may be operable to identify sensor target location information of encountered sensor targets from received sensor data such as a map indicating a street intersection, a view with a business or residential building, and/or a train station announcement. The identified sensor target location information of the encountered sensor targets may be utilized by the host processor 210 to locate the GNSS enabled mobile device 200. Specifically, the host processor 210 may be operable to combine the identified sensor target location information of the encountered sensor targets with the most current GNSS measurements in the first area 101 to determine and/or refine the location of the GNSS enabled mobile device 200 within the second area 102.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for sensor-assisted location-aware mobile device.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication in an environment, the method comprising:
   performing by one or more circuits in a Global navigation satellite-based systems (GNSS) enabled mobile device:
      in a first area where GNSS signal quality is above a particular threshold value:
         acquiring GNSS signals from one or more GNSS satellites;
         calculating a position of the GNSS enabled mobile device based on the GNSS signals; and
         storing the calculated position as previous GNSS measurements; and
      in a second area where the GNSS signal quality is below the particular threshold value:
         acquiring sensor data of sensors located throughout the environment, the sensor data of at least one of the sensors including locations of a plurality of sensor targets; and
         determining a location of the GNSS enabled mobile device in the second area based on the locations of the sensor targets and the previous GNSS measurements calculated by the GNSS enabled mobile device when the GNSS enabled mobile device was in the first area.

2. The method according to claim 1, comprising receiving GNSS signals from a plurality of visible GNSS satellites whenever the GNSS enabled mobile device is in the first area.

3. The method according to claim 2, comprising calculating GNSS measurements utilizing the GNSS signals received in the first area.

4. The method according to claim 3, comprising updating the previous GNSS measurements utilizing the calculated GNSS measurements.

5. The method according to claim 4, comprising determining the position of the GNSS enabled mobile device within the second area utilizing the updated previous GNSS measurements in the first area.

6. The method according to claim 1, comprising collecting, in the second area, the sensor data from the sensors for encountered sensor targets with known locations within the environment in the second area.

7. The method according to claim 6, wherein the sensors comprise an image sensor, a light sensor, an audio sensor and/or a location sensor.

8. The method according to claim 6, comprising refining the determined location of the GNSS enabled mobile device in the second area utilizing the locations of the sensors.

9. The method according to claim 1, further comprising compiling, by each of the sensors, information from a plurality of sensor targets.

10. The method according to claim 9, wherein the plurality of sensor targets includes at least one of a physical object, an indoor space, and an outdoor space.

11. The method according to claim 1, further comprising powering down a GNSS receiver when in the second area.

12. A Global navigation satellite-based systems (GNSS) enabled mobile device capable of communicating in an environment, the GNSS enabled mobile device comprising:
   a GNSS receiver configured to acquire GNSS signals from one or more GNSS satellites when the GNSS enabled mobile device is in a first area where GNSS signal quality is above a particular threshold value;
   a host processor configured to calculate a position of the GNSS enabled mobile device based on the GNSS signals;
   a memory configured to store the calculated position as previous GNSS measurements;
   a wireless transceiver configured to acquire sensor data of sensors located throughout the environment when the GNSS enabled mobile device is in a second area where the GNSS signal quality is below the particular threshold value, the sensor data of at least one of the sensors including locations of a plurality of sensor targets, and
   wherein the host processor is configured to determine a location of the GNSS enabled mobile device in the second area based on the locations of the sensor targets and the previous GNSS measurements calculated by the GNSS enabled mobile device when the GNSS enabled mobile device was in the first area.

13. The GNSS enabled mobile device according to claim 12, wherein the GNSS receiver is configured to receive GNSS signals from a plurality of visible GNSS satellites whenever the GNSS enabled mobile device is in the first area.

14. The GNSS enabled mobile device according to claim 13, wherein the host processor is configured to calculate GNSS measurements utilizing the GNSS signals received in the first area.

15. The GNSS enabled mobile device according to claim 14, wherein the host processor is configured to update the previous GNSS measurements stored in the memory utilizing the calculated GNSS measurements.

16. The GNSS enabled mobile device according to claim 15, wherein the host processor is configured to determine the position of the GNSS enabled mobile device within the second area utilizing the updated previous GNSS measurements in the first area.

17. The GNSS enabled mobile device according to claim 12, wherein the wireless transceiver is configured to collect, in the second area, the sensor data from the sensors for encountered sensor targets with known locations within the environment in the second area.

18. The GNSS enabled mobile device according to claim 17, wherein the sensors comprise an image sensor, a light sensor, an audio sensor and/or a location sensor.

19. The GNSS enabled mobile device according to claim 17, wherein the host processor is configured to refine the determined location of the GNSS enabled mobile device in the second area utilizing the locations of the sensors.

* * * * *